United States Patent [19]

Galand et al.

[11] Patent Number: 5,838,922
[45] Date of Patent: Nov. 17, 1998

[54] BACK PRESSURE ACCESS CONTROL SYSTEM FOR A SHARED BUFFER WITH ALLOCATION THRESHOLD FOR EACH TRAFFIC CLASS

[75] Inventors: Claude Galand, Cagnes/Mer; Aline Fichou, La Colle sur Loup; Pierre Austruy, Nice, all of France; Ilias Iliadis, Ruschlikon, Switzerland

[73] Assignee: International Business Machines Corporation, Armonk, N.Y.

[21] Appl. No.: 660,318

[22] Filed: Jun. 7, 1996

[51] Int. Cl.[6] .............................. G06F 13/14; H04L 12/54
[52] U.S. Cl. ................................ 395/200.62; 395/200.65; 370/412; 370/413; 370/429; 370/462
[58] Field of Search ..................... 395/200.43, 200.55, 395/200.56, 200.62, 200.65, 872, 876, 856, 859; 370/412, 413, 429, 462

[56] References Cited

U.S. PATENT DOCUMENTS

| 4,679,190 | 7/1987 | Dias et al. | 370/355 |
| 5,008,878 | 4/1991 | Ahmadi et al. | 370/353 |
| 5,153,877 | 10/1992 | Esaki et al. | 370/462 |
| 5,412,781 | 5/1995 | Lukas et al. | 395/876 |
| 5,434,848 | 7/1995 | Chimento, Jr. et al. | 370/462 |

OTHER PUBLICATIONS

"Packet Switching Module" IBM Technical Disclosure Bulletin, v32 n10B, Mar. 1990, pp. 176–177, 1990.
Iliadis et al., "Performance of Packet Switches with Input and Output Queuing", IEE International Conf. On Communication, Apr. 1990, pp. 316.3.1–7.
Iliadis "Head of Line Arbitration of Packet Switches with Combined Input and Output Queuing", Intern. Journalof Digital and Analog Comm Syst., V4, 1991, pp. 181–190.
Badran et al. "Head of Line Arbitration in ATM Switches with Input–Output Buffering and Backpressure Control", GLOBECOM '91, pp. 11.4.1–5.
Badran et al. "Input–Output–Buffered ATM Switches with Delayed Backpressure Mechanisms", Electrical and Computer Engineering, 1993 Canadian Conf., pp. 771–774.
Schaffa et al. "A Demand Driven Access Protocol for High Speed Networks", Future Trends of Distributed Computing System '91 Workshop, pp. 158–164, 1992.
Umayabashi et al. "Input and Output Queueing Packet Switch with Backpressure Mode and Queue Loss Mode for Two Classes", Comm., Computers and Signal Processing, 1995, pp. 169–172.
Chiussi et al. "Backpressure in Shared–Memory–Based ATM Switches under Multiplexed Busty Sources", INFOCOM '96, pp. 830–846.

*Primary Examiner*—Dinh C. Dung

[57] ABSTRACT

An improved access control system for a memory system in which memory locations can be allocated to virtual output queues dedicated to output ports from the system. The virtual queues can be used to handle data of different priorities. Thresholds are defined for the occupancy of the overall memory and of each virtual queue. The access control system regulates the acceptance of data stored in input adapters by determining whether a back pressure situation exists for the data's target output adapter for the class of traffic to which the data belongs. A single-bit access-controlling back pressure signal is generated as a function of the occupancy level of either the overall memory or of the virtual queue defined for the target output adapter.

2 Claims, 2 Drawing Sheets

BACK PRESSURE ACCESS CONTROL SYSTEM FOR A SHARED BUFFER WITH ALLOCATION THRESHOLD FOR EACH TRAFFIC CLASS

FIELD OF THE INVENTION

The invention relates to an access control system for a shared buffer or memory. It particularly pertains to such an access control system for a buffer capable of storing data having different priorities and having a shared part and a plurality of dedicated parts. Even more specifically, it relates to a switch for transferring data traffic between a plurality of input ports and a plurality of output ports.

BACKGROUND OF THE INVENTION

Fast switching of information is an increasingly important factor in a broad field of digital data applications ranging from parallel multiprocessor computing to networks for global telecommunication. In spite of the obvious differences in scale and purpose, these applications share fundamental problems growing from the high degree of parallelism involved. Among the most basic problems encountered are those of coordination and contention.

With an ever increasing number of participants sharing common resources, independently of whether the resources are microprocessors, data storage devices, data buses, copper wires or optical fibers, the coordination of access to the resources among these participants becomes an intricate task. Solutions to this task must be provided independently of the participants, who interact with one another only at the moment they try to gain access to the shared resource.

Deeply interwoven with the problem of coordination is the problem of contention. Because providing enough resources to satisfy any demand of any participant at any time is uneconomical, shared resources inevitably can become bottlenecks. Where two or more users or participants attempt to simultaneously access a shared resource, a decision concerning preferences has to be made. The problem of contention, if not solved by making more shared resources available, has been tackled in the prior art through basically two mechanisms. These mechanisms can be characterized as being either of a statistical nature or using a priority setting. Though the statistical approach is successfully applied in various devices (for example, FIFO-type buffers, CSMA/CD-type data communication protocols, etc.), a preference toward access schemes with a higher degree of determinism is noticeable.

Proposed public Broadband Integrated Services Digital Networks (BISDN) provide an illustrative example for these preferences. Integrated services networks are designed to equally support voice, video and data transmission. Different types of information, being in some cases delay sensitive and in other cases loss sensitive or bursty, must be handled differently. A natural solution to the contention problem is therefore found in assigning different types of information to different priority categories or equivalents thereof. A priority classification tag is attached to the "pure" information triggering a desired process for handling information classified in this manner. As an example, video and audio data traffic, being delay sensitive, might be classified as high priority traffic while file transfers and e-mail, being relatively delay insensitive, might be classified as low priority traffic.

Before returning to the problems described above, the field of telecommunications will be briefly introduced as it is the predominant field in which high-speed data switches are applied. Developments in the telecommunications field usually are considered state-of-the-art for all related fields.

As already indicated above, new and sophisticated telecommunication services like BISDN are giving rise to multimedia applications, including the transmission of data, voice, and video. These telecommunication services require a high degree of flexibility in use of bandwidth, which is found to be best provided by packet switching due to its capability to allocate bandwidth dynamically and to efficiently utilize resources by multiplexing. In particular, Asynchronous Transfer Mode (ATM) technology, which is based on the transmission of short, fixed-length packets of data, called cells, is expected to be the integrated switching and transmission standard for future public BISDN systems. For private networks both ATM and Fast Packet Switching (FPS), based on variable-length packets, are under consideration. Anticipated data transfer rates surpass 100 Megabits/second and extend into the low Gigabits/second range. These rates are influenced by the evolution of optical transmission standards such as SONET/SDH.

Advances in Very Large Scale Integration (VLSI) microchip technology allow the development of high-speed switches able to accommodate the future transmission rates. As opposed to conventional packet switches, which are mainly based on software processing, these new advanced packet switches are hardware-based. Their topologies and buffer arrangements for contention resolution employ a high degree of modularity. Their routing functions, typically performed in a distributed manner at the hardware level, is referred to as self-routing. Examples for advanced packet switch devices can be found in the following documents.

In U.S. Pat. No. 4,679,190, a multi-stage interconnection network is described as capable of switching synchronous and asynchronous data packets while insuring that packets with the highest assignable priority will not be blocked at any stage of the switching network. Data packets carrying voice information are given a higher priority than other types of data packets. Contention at any stage of the switch element or fabric is resolved by allowing the packet with higher priority to pass first. Low priority data packets are blocked and remain in a data buffer at the input adapter. Providing buffer space, i.e. memory, at the input adapter is generally known as input queuing. Collisions of packets having the same priority are handled by an arbitration section in accordance with predetermined rules, such as a round robin arbitration scheme.

Classical input queuing, described above, is inferior to output queuing from a performance point of view. The performance advantage of output queuing is exploited in a switch as described in U.S. Pat. No. 5,008,878. The basic switch configuration consists of input adapters connected to a switch fabric via switch input ports. The output ports of the switch fabric are linked to output adapters. At the input adapters, data provided by various services using packet switched and circuit switched interfaces (data from computers, telephones, and other sources) are collected and formatted into uniform minipackets with a packet header, containing routing information designating the desired output port, the length of the payload, and the priority class of the payload. Restoration of the switched data to its original format is performed at the output adapter. The switch fabric itself is a fast, self-routing interconnection network. A pair of FIFO queuing buffers is assigned to each output port. The first buffer of each pair queues high priority traffic, which must be dispatched within a given cycle time, and the second buffer queues low priority or non-reserved bandwidth traffic. The priority scheme is enforced by serving the high priority queue first. If no packet is waiting in the high priority queue, then the second or low priority buffer can be connected to the switch output port.

In an article in the *IBM Technical Disclosure Bulletin*, vol. 32, no. 10B, Mar. 1990, pp 176–177 entitled "Packet Switching Module", and in European patent applications EP-A-0492025 and EP-A-0492026, methods for dynamically allocating buffer space to single output port from a common output buffer are described, relaxing further the output port contention, particularly for bursty data traffic. In a variant of this buffer management system, part of the memory space may be reserved to one output port. This "virtual" dedicated buffer is not available for data of another output port, thus introducing the concept of dedicated buffer in common output storage systems.

From several other sources, as for example, a) Iliadis and W. Denzel, "Performance of Packet Switches with Input and Output Queuing", *IEEE International Conference on Communication*, Apr. 16–19, 1990, pp. 316.3.1–7, b) Iliadis, "Head of Line Arbitration of Packet Switches with Combined Input and Output Queuing", *Intern. Journal of Digital and Analog Comm. Syst.*, Vol. 4(1991), pp. 181–190, or c) H. F. Badran and H. T. Mouftah, "Head of Line Arbitration in ATM Switches with Input-Output Buffering and Backpressure Control", *Proc. of GLOBECOM'91*, Phoenix, Ariz., Dec. 2–5, 1991, pp. 11.4.1–5, a combination of input and output queuing is suggested with the aim of achieving a high performance/cost ratio by combining moderate amounts of highly efficient, but more expensive output memory with larger amounts of input memory, which is significantly less expensive but also less efficient. The size of the buffers is primarily determined by the desired probability of data packet loss. The concept of combined input and output queuing can be extended to the case of buffered multistage switch fabrics with each of the stages being supplied with input queues of their own.

Potential overflow of the output buffer is treated by a backpressure mechanism which prevents the transmission of incoming packets for the period in which the output buffer cannot provide sufficient space. Flow control is enforced by a backpressure signal which causes the packet to either be discarded or to wait at the head of the input queue until the backpressure situation is resolved.

For different classes of traffic, several proposals are known which describe the conditions under which a backpressure signal is generated. The most pertinent to the current invention is known as "partial buffer sharing", which is conceptually described by A. Lin and J. Sylvester in *IEEE Journal on Selected Areas in Communications*, Vol.9, No. 9, Dec. 1991, pp.1524–1536. The partial buffer sharing method is based on introducing limits or thresholds on the buffer space available to all classes of traffic. When these limits are exceeded, only data of higher classes are admitted to the buffer.

An implementation of this concept is described in European Patent application EP-A-0 639 014. This implementation involves a first intermediate buffer and a second buffer. The occupation level of the second buffer is monitored, and incoming data cells of a certain priority class are rejected as soon as the threshold associated with this priority class is exceeded.

Known applications of the partial buffer sharing have, up to now, been restricted to simple buffer structures, e.g. FIFO queues. It is therefore an object of the invention to improve the known partial buffer sharing system so as to be applicable to a complex buffer structure wherein the buffer space for an output link is dynamically allocated within a common buffer space. It is a particular object of the invention to introduce a technique for generating a backpressure signal in such a system.

SUMMARY OF THE INVENTION

The invention may be implemented as an access control system having data storage for storing at least two different classes of data traffic or services. There are at least two thresholds associated with each class of traffic or service. One threshold is defined for occupancy level of global or unallocated storage. Other thresholds are defined for occupancy levels of each of the dynamically allocated parts of the storage which serve one of the output ports. Thus, even when the storage contains data destined for only one of the output ports, two occupancy levels are monitored when deciding whether to accept incoming data or not. If the storage contains data waiting for transmission to more than one output port, the number of relevant thresholds for each of the classes increases accordingly. Furthermore, the thresholds associated with a particular class of traffic can have different values for different output ports.

Compared to the prior art, the current invention offers a larger number of conditions for determining whether to accept incoming data. By monitoring not only the availability of common or global storage but also the availability of port-dedicated storage, the contention or competition for the common global storage among all output ports can be controlled.

This refinement is advantageously exploited in a preferred embodiment of the invention, which includes means for identifying the target output port for received data. The decision of whether to accept data stored at an input adapter can be based on the availability of common storage or the availability of storage previously dedicated to the target port. In this embodiment, input data is not accepted for switching when the threshold associated with the class to which the data belongs is reached or exceeded either in the common storage or in the port-dedicated storage. To this end, the outputs of threshold monitors for the port-dedicated storage and for the common storage are subject to a Boolean OR operation. In connection with this embodiment of the invention, it should be noted that means for identifying the target output port for received data already exists in any multiple output memory. Hence, the current embodiment makes use of existing means, though for a different purpose. As a consequence, the additional circuitry required to implement this embodiment is reduced.

In a further preferred embodiment of the invention, the signal which is retransmitted to the input adapter to indicate whether the waiting input data should be transferred into the switch fabric is reduced to a single bit irrespective of the number of thresholds and traffic classes. With respect to an ever increasing number of I/O ports and a limitation in the number of available I/O pins dictated by current chip design technology, this embodiment provides an important advantage.

The above and other advantageous features of the invention will be apparent from the following drawings and related description of an embodiment of the invention, the adaptation of which to other known and future designs and technical fields should pose a trivial task for a skilled person.

BRIEF DESCRIPTION OF THE DRAWINGS

While this specification concludes with claims that particularly point out and distinctly claim that which is regarded as the present invention, details of a preferred embodiment of the invention may be more readily ascertained from the following detailed description when read in conjunction with the accompanying drawings wherein:

DESCRIPTION OF PREFERRED EMBODIMENT

Figure 1:
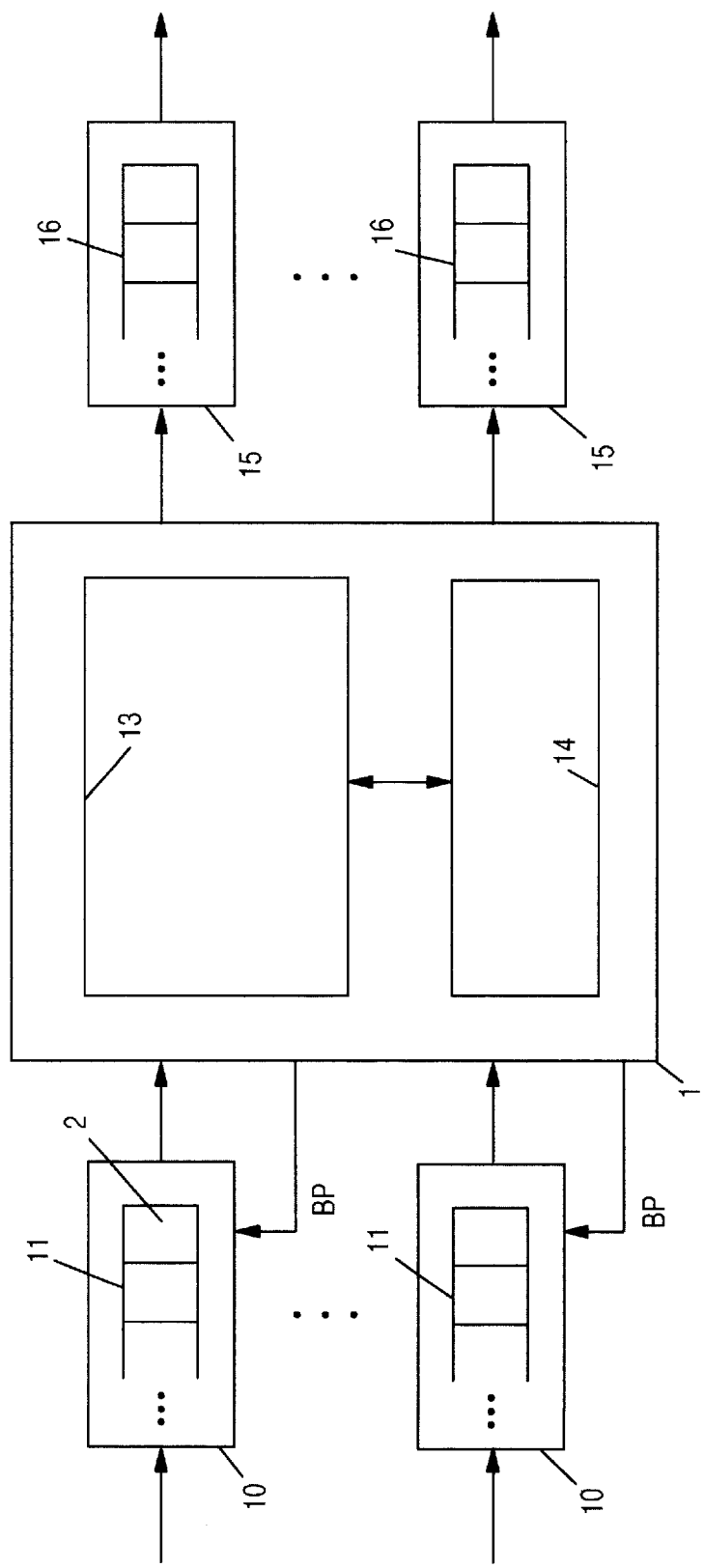
FIG. 1 shows the basic structure of a switch with input and output port adapters and a shared output buffer to which the invention is applied.

A possible use of the current invention is described below and with reference to a communication switch shown in FIG. 1. The general k×l switch structure 1 comprises k input lines and l output lines, with k and l both equaling sixteen in the present example. Input adapters 10 format, if necessary, the incoming data stream into fixed length cells and adds a header to the formatted data. The header includes routing information to guide the data through the following switch fabric to the correct output port. Also included in the header are priority class information, which determine the class of traffic to which the data belongs. The input adapter also receives a backpressure signal BP, generated in the switch in case of overflow, as will be described in greater detail below. Each input adapter has a buffer 11 to store arriving packets of data. Single storage units within the buffer memory are referred to as cells 2 in deference to the name used for data packets in Asynchronous Transfer Mode (ATM) traffic.

The switch itself comprises a memory section 13 to store the incoming data for subsequent transfer to switch output ports. By utilizing the information contained in the header section of the incoming data and proper management of memory storage addresses (pointers), the memory section 13 may, at any given time, contain a number of virtual or logical FIFO queues, each exclusively assigned to one of the output ports. This assigned storage may, from time to time, be referred to as portdedicated storage. All memory space not allocated to a virtual FIFO queue, is, in principle available for storage of any incoming data. Thus, the potential maximum length of a port-dedicated queue is limited only by the amount of available memory; that is, memory not already allocated to other output ports. A control section 14 manages and distributes the addresses of available, non-allocated memory to this end. It is yet important to note that the control section keeps track of all address pointers and can therefore easily be exploited to monitor the availability of both non-allocated storage space and the size of each output queue already established for a given output port.

The output port adapters 15 restore switched data to its original format for subsequent processing or transmission. The output adapters include additional buffers 16 for storage of data. These additional buffers should not be confused with the output queues within the switch memory.

Figure 2:
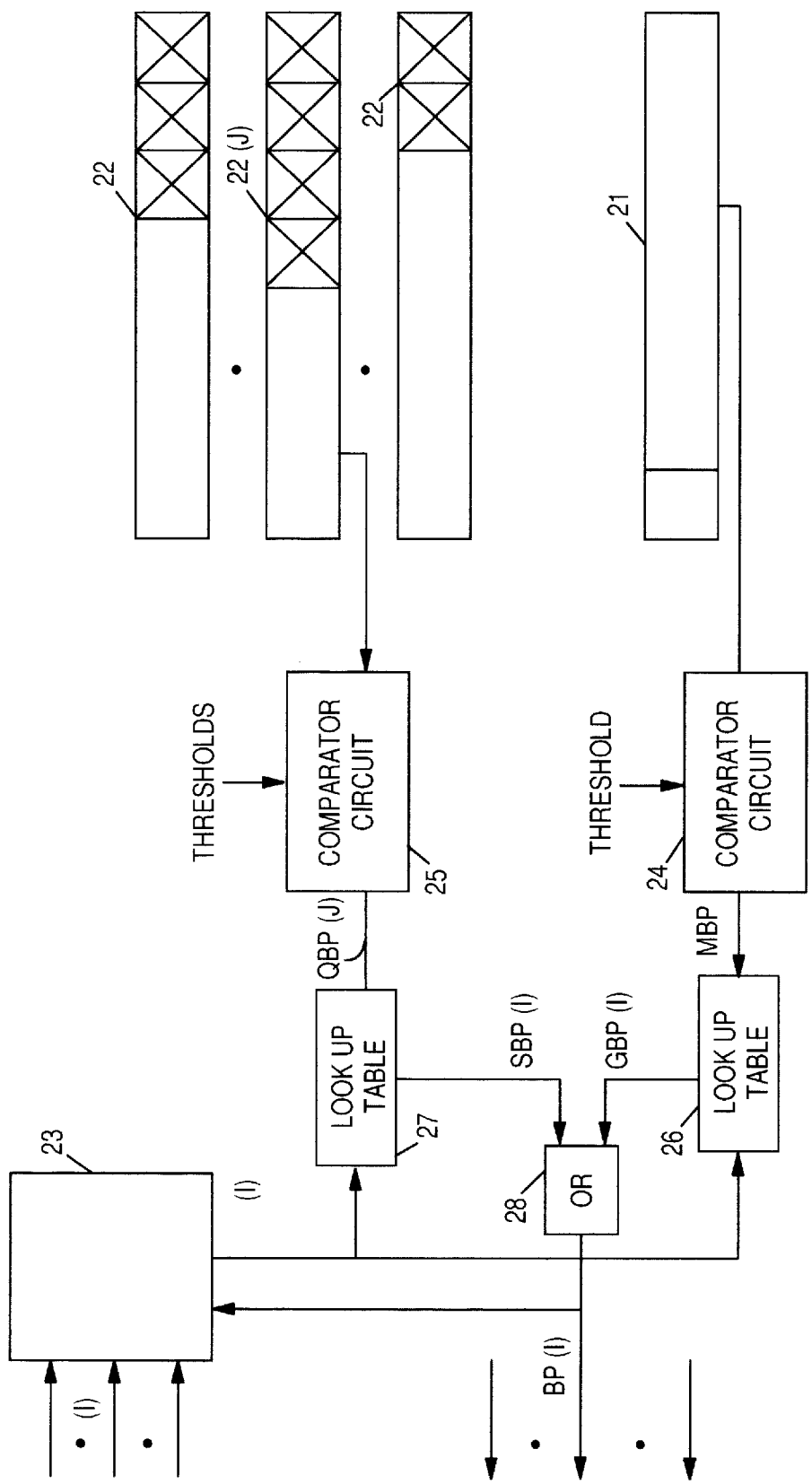
FIG. 2 shows a detailed view of the control section of the shared output buffer of FIG. 1 with elements of the invention.

Elements of the invention are described below and with reference to FIG. 2, which shows the control section 14 of the switch memory in greater detail. However, connections for only one of the sixteen output queues and for the free (non-allocated) pointer queue are depicted as all other queues are connected analogously.

The control section 14 comprises pointer queues 21, 22 for storing address pointers to memory locations or cells in the memory section 13. One queue 21 contains the pointers to all free (non-allocated) locations in memory section while the other queue 22 store pointers to cells which are part of a queue already dedicated to a particular output port. Since the pointer queues are of the FIFO (first in first out) type, the storage locations identified by the pointers effectively form a FIFO data queue even though those storage locations are non-contiguous and may actually be distributed almost randomly in memory section 13.

The control section further comprises a header processing section 23 which processes the header of the incoming data cell to identify the target output port. Once the target output port is identified, a pointer from the free pointer queue 21 is fetched and added to the end of the pointer queue 22 assigned to this output port. The data cell is stored in the memory section 13 at the address indicated by the pointer. To transfer data through the switch, the data associated with a pointer at the top of a dedicated pointer queue is read out. Once this data is read out, the same pointer, which now points to a free address in the storage, is added to the end of the free pointer queue 21.

Comparator circuits 24, 25 are provided for monitoring the size of the free pointer queue 21 and the size of the dedicated queues 22 and for comparing these sizes with preset thresholds. The outputs MBP, QBP(j) of the comparators are used for look-up operations 26, 27, which also take into consideration the class of traffic assigned to the next arriving data cell. As noted earlier, the class of traffic is established by operation of the header processing system 23. The table lookup operation, which is explained in detail below, results in a one-bit output SBP(i) representing a particular dedicated queue or a one-bit output GBP(i) representing the free pointer queue. Here and in the following, the global backpressure signal is indexed to indicate that its value is a function both of memory usage and of classes of traffic. The active input adapter (i) which is the source of the cell being processed and the header processing section 23 both receive a backpressure signal, generated by an OR gate 28 to which SBP(i) and GBP(i) are applied. If the backpressure signal is reset or low, the header processing section performs the storing procedure as described above. If the backpressure signal is set or high, the storage in the global storage is blocked and the cell is retained in the input adapter for a later attempt at re-entry into the switch.

In the following the comparators 24, 25 and the table look-up operations 26, 27 are further described assuming the existence of three classes of traffic, i.e., real-time reserved bandwidth traffic (RT), non-real-time reserved bandwidth traffic (NRT), and nonreserved bandwidth traffic (NR).

At each switch cycle, each input adapter can send a switch cell to the switch, assuming there is a cell to transmit. The back-pressure signal sent back by the switch to input adapter i (i=1, . . . 16) is identified as BP(i). The BP(i) signal is computed by the BP generation section using the binary signals GBP(i) and SBP(i), which represent global and selective backpressure respectively, according to the relation BP(i)=GBP(i) or SBP(i).

In the following, the evaluation done by the control section for GBP and SBP signals, for each input port at each switch cycle, is described:

To determine whether a global back pressure signal should be generated for a given class of traffic, the threshold monitor keeps track of the variable MBP which is determined from the number n of occupied cells in the storage and the three previously-determined, class-dependent thresholds T(rt), T(nrt), T(nr) according to the following:

MBP=0 if n<T(nr) (no threshold is reached);
MBP=1 if T(nr)≦n<T(nrt) (NR threshold is reached);
MBP=2 if T(nrt)≦n<T(rt) (NRT threshold is reached); and MBP=3 if T(rt)≦n (RT threshold is reached)

The global back pressure variable GBP(i) for port i is determined as follows. The class of traffic of the data at input adapter i and the current variable MBP are used to look up the binary value of GBP(i) from the 3×4 table TABG set forth below. Specifically, GBP(i)=TABG(class of traffic, MBP), wherein the class of traffic (i in the table) is coded as: 0=real-time reserved-bandwidth traffic; 1=non-real-time reserved-bandwidth traffic; and 2=non-reserved-bandwidth traffic while MBP (j in the table) has one of the four values noted above depending on which threshold (if any) has been reached.

TABLE TABG

| TABG(i,j) | j = 0 | j = 1 | j = 2 | j = 3 |
|---|---|---|---|---|
| i = 0 | 0 | 0 | 0 | 1 |
| i = 1 | 0 | 0 | 1 | 1 |
| i = 2 | 0 | 1 | 1 | 1 |

As is easily seen, as a general principle, lower priority traffic is rejected in favor of higher priority traffic.

The generation of selective backpressure signals for each priority class is determined by thresholds defined for the pointer queues dedicated to the output ports.

For each logical output queue, the backpressure signal generator keeps track of a variable QBP(j), j=1, ..., 16, which is determined from the number n(j) of cells stored in the FIFO queue allocated to output port j. The variables QBP(j) are determined from 3 different previously-determined thresholds: TQ(rt), TQ(nrt), and TQ(nr):

QBP(j)=0 if n(j)<TQ(nr) (no threshold is reached);

QBP(j)=1 if TQ(nr)≦n(j)<TQ(nrt) (NR threshold is reached);

QBP(j)=2 if TQ(nrt)≦n(j)<TQ(rt) (NRT threshold is reached);

QBP(j)=3: if TQ(rt)≦n(j) (RT threshold is reached).

The selective back pressure signal SBP(i) is generated as a function of the class of traffic of the cell at input adapter i, and the QBP variable for target output port j. These variables are used to look-up the binary value of SBP(i) in the 3×4 table TABG mentioned earlier.

As described above, a logical OR of the SBP(i) and GBP(i) signals results in a single bit backpressure signal BP(i).

While there has been described what is considered to be a preferred embodiment of the present invention, variations and modifications in that embodiment will occur to those skilled in the art once they learn of the basic inventive concepts. Therefore, it is intended that the appended claims shall be construed to include the preferred embodiment and all such variations and modifications as fall within the true spirit and scope of the invention.

What is claimed is:

1. An access control system for a data system including a memory system (13) capable of storing at least two different classes of data traffic, a plurality of input adapters (10) for data to be made available to said memory system, a plurality of output adapters (15) for receiving data from said memory system, storage control means (14) (i) for dynamically allocating locations in said memory system to queues assigned to particular output adapters, (ii) for monitoring the number of memory locations already allocated throughout the memory system and (iii) for monitoring the number of memory locations allocated to a particular output adapters, said access control system being characterized by having:

for each different class of traffic, means for defining allocation thresholds for data stored anywhere in said memory system;

for each different class of traffic, means for defining allocation thresholds for data stored in a queue previously allocated to a particular output adapter;

means (23) for identifying the traffic class and the target output adapter for data traffic available at a selected one of said input adapters;

means for generating a back pressure signal as a function of the class of the data traffic at said selected one of said input adapters and of whether or not defined allocation thresholds for the target output adapter have been equalled or exceeded; and means for accepting the data traffic available at said selected input adapter only if no back pressure signal was generated.

2. An access control method for use in a data system including a memory system (13) capable of storing at least two different classes of data traffic, a plurality of input adapters (10) for data to be made available to said memory system, a plurality of output adapters (15) for receiving data from said memory system, storage control means (14) (i) for dynamically allocating locations in said memory system to queues assigned to particular output adapters, (ii) for monitoring the number of memory locations already allocated throughout the memory system and (iii) for monitoring the number of memory locations allocated to a particular output adapters, said access control method being characterized by the steps of:

for each different class of traffic, defining an allocation threshold for data stored anywhere in the memory system;

for each different class of traffic, defining allocation thresholds for data stored in a queue previously allocated to a particular output adapter;

processing data traffic available at a selected one of said input adapters to identify the class of the data traffic and the target output port for the data traffic is intended;

generating a back pressure signal as a function of the class of the data traffic and of whether or not defined allocation thresholds for the target port have been equalled or exceeded; and means for accepting the data traffic available at said selected input adapter only if no back pressure signal was generated.

* * * * *